United States Patent Office 3,327,128
Patented June 20, 1967

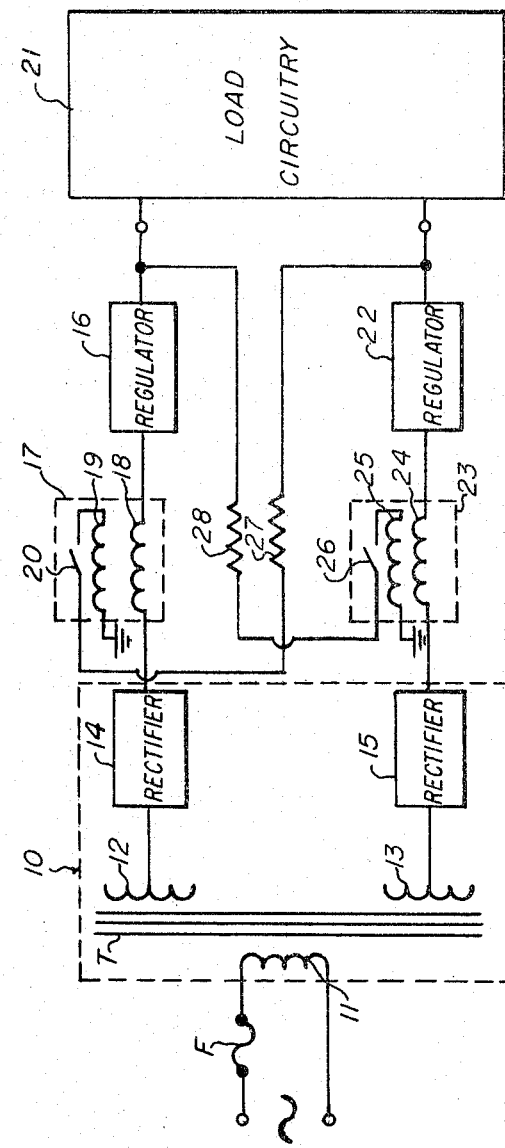

3,327,128
PROTECTION CIRCUITRY UTILIZING
ARTIFICIAL LOADING
James Lafreniere, Ottawa, Ontario, Canada, assignor to Northern Electric Company Limited, Montreal, Quebec, Canada
Filed May 10, 1965, Ser. No. 454,278
8 Claims. (Cl. 307—86)

This invention relates to circuit protecting apparatus and more particularly to an apparatus for protecting load circuitry supplied by a power supply having a plurality of output supplies.

In power supplies, it is often necessary to protect both the power supply itself and the load circuitry supplied by the power supply. For example, in semiconductor circuitry requiring balanced plus and minus supply voltages it is not only necessary that the plus and minus supplies be turned off when either or both are overloaded for the protection of the power supply components, but often the circuitry itself must be protected from voltage surges due to the overload of one of the output supplies. Such circuitry, for protection, demands that if the plus supply were overloaded, for example, the whole power supply be turned off.

There are many known circuits which will protect individual power supplies. U.S. Patent 3,090,905 issued to R. J. Ehret on May 21, 1963, discloses a power supply overload protection system wherein current limiting is used in both the plus and minus sections of the power supply. The disadvantage of the known protection circuits for power supplies having two or more output supplies is that when one output supply is overloaded the other supply continues to function which may be damaging to the load circuitry particularly when the load circuitry involves semiconductor devices.

It is therefore an object of the invention to provide a power supply overload protection apparatus for a multi-output power supply wherein an overload in one output will turn off the whole power supply.

This object has been achieved in accordance with the invention, by inserting an overload current sensing device in each of the output supplies of a multi-output power supply. When an overload is sensed by any one sensing device, that one sensing device will cause an artificial load such as a resistor to be connected to a second output supply thereby overloading the second output supply and operating its associated sensing means. The operation of the second sensing means will connect a second artificial load to a third output supply and so on until the operation of the last sensing means connects an artificial load to the one output supply. Every output supply will then be artificially overloaded and this will cause some means located in the input circuit of the power supply to turn off the whole power supply.

Overload currents in the regulator portion of the power supply may be controlled by current limiting and by the value of the artificial load used.

The invention will now be described with reference to a drawing illustrating an embodiment of the invention. In the drawing, there is shown a power supply 10 comprising a transformer T having a primary winding 11 connected to an A.C. source and two secondary windings 12 and 13 connected to rectifiers 14 and 15 respectively. The circuit of the primary winding 11 includes a fuse F. Rectifiers 14 and 15 provide for two separate sources of output supply.

The output from rectifier 14 is connected to a voltage regulator 16 through a relay 17 which may be a reed relay having a sensing winding 18, a latch winding 19 and a contact 20 operated by relay winding 18. The output from regulator 16 is applied to load circuitry 21.

Similarly, the output from rectifier 15 is connected to a voltage regulator 22 through a relay 23 having a sense winding 24, a latch winding 25 and a contact 26 operated by winding 24. The output from regulator 22 is also applied to the load 21.

Load 21 may be a semiconductor circuit requiring a balanced power supply having plus and minus output supplies.

An additional load circuit is connected to the first output supply. The additional load circuit comprises resistance 27, normally open contacts 26 and latch winding 25 of relay 23. Similarly an additional load circuit is connected to the second output supply. The additional load circuit comprises resistance 28, normally open contacts 20 and latch winding 19 of relay 17.

If the threshold of closing in relay 17 is exceeded for example, contact 20 of relay 17 will be closed and the circuit extending from the output of regulator 22 and comprising resistance 28, contacts 20 and latch winding 19 will be completed thereby connecting an additional load on regulator 22. This artificial load will overload the output supply associated with regulator 22 and will cause operation of relay 23 which will in turn operate and by closing contact 20 connect an additional load on regulator 16. Consequently, both output supplies will be heavily overloaded and cause the opening of fuse F located in the primary of power supply 10. Latch windings 19 and 25 maintain contacts 20 and 26 operated once operated by windings 18 and 24 respectively.

Similarly, if an excess current is drawn from the second output supply, relay 23 will be energized causing closure of contacts 26. This will complete a circuit connecting resistance 27 at the output of the first output supply and cause overloading of the first output supply. Overloading of the first output supply will cause operation of relay 17 which will close contacts 20 and connect an additional load to the second output supply. Consequently, fuse F will open and turn off the whole power supply.

Overload currents in regulators 16 and 22 may be controlled by current limiting and by the value of the additional load used.

It is understood that the embodiment described is only illustrative of the invention and that the invention may equally be used here it is desired to protect a power supply having more than two output supplies. In such a case, an overload current in one output supply will connect an additional load to a second output supply and operate its associated sensing means such as shown in FIGURE 1. However, if there is more than two output supplies, the operation of the second sensing means will cause an additional load to be connected to a third output supply and so on. The operation of the last sensing means will, such as shown in FIGURE 1, connect an additional load to the first output supply.

What is claimed is:

1. An apparatus for protecting load circuitry supplied by a power supply having an input circuit and a plurality of output supplies comprising:
    (a) means connected to each output supply for sensing an overload current flowing therein;
    (b) means operated by any one sensing means in response to an overload current in any one output supply for connecting an additional load to a second output supply thereby overloading said second output supply and operating its associated sensing means, the operation of the second sensing means connecting an additional load to a third output supply and so on, the operation of the last sensing means connecting an additional load to the one overloaded output supply whereby every output supply is artificially overloaded and (c) means located in the input circuit of the power supply for turning off the whole power supply in response to said overload.

2. An apparatus as defined in claim 1 wherein said sensing means is a relay having a winding connected in series with the output supply and wherein said means operated by said sensing means are contacts of said relay which are connected in series with the additional load.

3. An apparatus as defined in claim 2 wherein said relay has a second winding in series with the additional load, said second winding maintaining the relay contact in locked position until the whole power supply is turned off.

4. An apparatus as defined in claim 1 wherein said means for turning off the whole power supply is a fuse.

5. An apparatus for protecting load circuitry supplied by a balanced power supply having an input circuit and plus and minus output supplies comprising;
   (a) means connected to each output supply for sensing overload current flowing therein
   (b) means operated by any one sensing means in response to an overload current any one output supply for connecting an additional load on the other output supply thereby overloading the other supply and operating its associated sensing means, the operation of the other sensing means connecting an additional load on the one output supply whereby both output supplies are artificially overloaded and
   (c) means located in the input circuit of the power supply for turning off the whole power supply in response to said overload.

6. An apparatus as defined in claim 5 wherein said sensing means is a relay having a winding connected in series with the output supply and wherein said means operated by said sensing means are contacts of said relay which are connected in series with the additional load.

7. An apparatus as defined in claim 6 wherein said relay has a second winding in series with the additional load, said second winding maintaining the relay contacts in locked position until the whole power supply is turned off.

8. An apparatus as defined in claim 5 wherein said means for turning off the whole power supply is a fuse.

References Cited
UNITED STATES PATENTS

| | | | |
|---|---|---|---|
| 2,403,637 | 7/1946 | Christie | 323—8 |
| 2,948,843 | 8/1960 | Klein | 323—81 |
| 3,215,896 | 11/1965 | Shattuck | 317—20 X |
| 3,222,575 | 12/1965 | Dexter | 317—20 |
| 3,240,997 | 3/1966 | Burgi | 317—33 |

ORIS L. RADER, *Primary Examiner.*

T. J. MADDEN, *Assistant Examiner.*